US012611775B2

(12) United States Patent
Chevron et al.

(10) Patent No.: US 12,611,775 B2
(45) Date of Patent: Apr. 28, 2026

(54) PROCESS FOR PAINTING A WORKPIECE COMPRISING GENERATING A TRAJECTORY SUITABLE FOR THE ACTUAL WORKPIECE

(71) Applicant: EXEL INDUSTRIES, Epernay (FR)

(72) Inventors: Didier Chevron, Moirans (FR); Nicolas Chouan, Allevard-les-bains (FR); Juan Palacio, Grenoble (FR)

(73) Assignee: Exel Industries, Epernay (FR)

( * ) Notice: Subject to any disclaimer, the term of this patent is extended or adjusted under 35 U.S.C. 154(b) by 697 days.

(21) Appl. No.: 17/954,624

(22) Filed: Sep. 28, 2022

(65) Prior Publication Data

US 2023/0103030 A1     Mar. 30, 2023

(30) Foreign Application Priority Data

Sep. 30, 2021    (FR) ...................................... 2110365

(51) Int. Cl.
　　*B25J 9/16*　　　　(2006.01)
　　*B25J 11/00*　　　(2006.01)
(52) U.S. Cl.
　　CPC ............. *B25J 9/1671* (2013.01); *B25J 9/163* (2013.01); *B25J 9/1664* (2013.01); *B25J 9/1684* (2013.01); *B25J 9/1697* (2013.01); *B25J 11/0075* (2013.01)
(58) Field of Classification Search
　　None
　　See application file for complete search history.

(56) References Cited

U.S. PATENT DOCUMENTS

| | | | | |
|---|---|---|---|---|
| 5,687,304 A | * | 11/1997 | Kiss | ........................ G06T 15/04 |
| | | | | 345/419 |
| 6,256,546 B1 | | 7/2001 | Graham | |
| 9,827,583 B2 | * | 11/2017 | Manzi | ................. B05B 13/0278 |
| 10,011,012 B2 | * | 7/2018 | Krasny | ................. B25J 9/1666 |
| 2021/0154852 A1 | | 5/2021 | Eyssautier | |

FOREIGN PATENT DOCUMENTS

| | | |
|---|---|---|
| EP | 3255517 A1 | 12/2017 |
| WO | 2020225350 A1 | 11/2020 |

OTHER PUBLICATIONS

Albiez, Christoph, et al. "Numerical prediction of thermal panel distortion incorporating thermal material properties of 6016 aluminum alloy." European Aluminium Congress. 2011. (Year: 2012).*

(Continued)

*Primary Examiner* — Carlos R Ortiz Rodriguez
(74) *Attorney, Agent, or Firm* — Soquel Group LLC

(57)　　　　ABSTRACT

The invention relates to a process for painting a workpiece using a painting robot including a robot arm equipped with a paint spraying device, the process including, an operation S1 of modeling a realistic 3D model corresponding to the workpiece as deformed and positioned in a paint cell, the realistic 3D model including paint trajectory information suitable for the workpiece as deformed and positioned in the paint cell, and a paint spraying operation S2 during which the paint spraying device is moved along the paint trajectory opposite the workpiece.

15 Claims, 3 Drawing Sheets

(56)                    References Cited

OTHER PUBLICATIONS

Qiu, Shiguang, et al. "Three-dimensional virtual-real mapping of aircraft automatic spray operation and online simulation monitoring." Virtual Reality & Intelligent Hardware 1.6 (2019): 611-621. (Year: 2019).*

Vempati, Anurag Sai, et al. "Paintcopter: An autonomous uav for spray painting on three-dimensional surfaces." IEEE Robotics and Automation Letters 3.4 (2018): 2862-2869. (Year: 2018).*

INPI Search Report for FR 2110365, May 12, 2022, 3 pages.

Gao, Huijun, et al., "Complex Workpiece Positioning System with Nonrigid Registration Method for 6-DoFs Automatic Spray Painting Robot", IEEE Transactions on Systems, Man, and Cybernetics: Systems, vol. 51, No., Dec. 12, 2021, pp. 7305-7313.

Gao, Huijun, et al., "Complex Workpiece Positioning System with Nonrigid Registration Method for 6-DoFs Automatic Spray Painting Robot", IEEE Transactions on Systems, Man, and Cybernetics: Systems, Jun. 2020, 9 pages.

Sortino, M., et al., "Compensation of geometrical errors of CAM/ CNC machined parts by means of 3D workpiece model adaptation", Computer-Aided Design, Elsevier Publishers BV., Barking, GB, vol. 48, Nov. 6, 2012, pp. 28-38, 11 pages.

* cited by examiner

3Dr

3Dn

PROCESS FOR PAINTING A WORKPIECE COMPRISING GENERATING A TRAJECTORY SUITABLE FOR THE ACTUAL WORKPIECE

CROSS-REFERENCE TO RELATED APPLICATION

This application is a U.S. non-provisional application claiming the benefit of French Application No. 21 10365, filed on Sep. 30, 2021, the contents of which are incorporated herein by reference in their entirety.

FIELD OF THE INVENTION

The invention relates to the general technical field of automated painting processes, in particular using painting robots, and more particularly painting robots equipped with a painting print head.

BACKGROUND OF THE INVENTION

It is known that spraying robots conventionally include a robotic articulated arm and a sprayer mounted on the arm, arranged for being moved opposite a workpiece to be painted or treated. Some painting robots come with print heads, mounted at the end of a robotic arm, which are used for printing paint patterns, or contrasting zones, on workpieces, in an automated way and without "overspray", i.e., without droplets coming from a cloud of paint sprayed by a paint sprayer being deposited outside the zone of the pattern to be painted. It is thus possible to paint the pattern or the contrast zone without the need to prepare the support beforehand, conventionally using self-adhesive masks. Such print heads generally include a plurality of nozzles arranged so as to form a strip of paint when the print head is moved opposite the surface to be painted.

In order to print a pattern on a workpiece to be decorated or to paint, e.g. a car body, it is known how to generate a trajectory from the CAD file (computer-aided design, 3D model of the workpiece) of the workpiece to be coated. A reference trajectory of the robot and each nozzle of the print head is defined with respect to the CAD model of the workpiece and with respect to the positioning of the CAD model of the workpiece in a 3D model of the coating cell, i.e., the zone of the production line wherein the operation of printing the pattern is performed. The trajectory defines the print head passage points with respect to the workpiece, and further includes activation instructions for every nozzle of the print head. The trajectory is defined for moving the print head opposite the zone to be painted so as to print the desired pattern on the zone to be painted.

Conventionally, the trajectories include a plurality of parallel lines along which the print head is moved, and activation of nozzles during movement leads to deposition of a strip of paint. The gap between the parallel lines is configured for both limiting an excessive overlap of paint stripes, in order to limit the use of paint, and for imperatively preventing any gap between the stripes, which would leave an uncoated zone on the pattern.

The CAD model of the workpiece is thus associated with printing trajectories specifically defined according to the geometry of the workpiece and to the zones to be treated.

In actuality, the manufactured workpiece has dimensional deviations from the CAD model. Such deviations can be large with respect to the accuracy required for printing, which can, e.g., reach an order of magnitude of several millimeters of deviation on an extended workpiece, e.g., a bonnet or a roof of a motor vehicle. Furthermore, there can be a deviation between the actual position of the workpiece in the coating cell and the theoretical position of the CAD model of the workpiece in the 3D model of the cell.

In addition to degrading the perceived quality of the printed pattern, such deviations can lead to a poor positioning of the patterns with respect to the references defined on the workpiece for positioning the pattern, e.g. style lines which have to coincide with an edge of the surface to be painted. Such a situation can generate further risks of collision between the robotic arm and the workpiece to be painted, which can lead to the destruction of the workpiece and to damaging the robot. Indeed, to prevent overspray, the print heads are designed for being moved to a very short distance from the workpieces to be painted. If the workpiece arrives in an incorrectly positioned paint cell due to a malfunction of the production line, there is a risk of collision between the workpiece and the robot. It is thus necessary to be able to adapt to the geometry of the workpiece and to the positioning thereof in space.

Document WO2020/225350 proposes a solution consisting of locally recording all the deviations by direct measurement on the component to be painted by performing a measurement operation with the painting robot. During the measurement operation, the same movement of the robot has to be nominally carried out so that the paint application is performed accurately. The above implies that the behavior of the robot and the influence of all errors during measurement and application are identical. The exact cause of a positioning error, e.g. deviations in the position of the component, the shape of the component or the positioning errors related to the temperature of the robot or of the component, are not relevant, because the measured value for every measurement point reflects the sum of all errors at the respective point. However, such a process involves the need to calculate a new paint trajectory for every workpiece measured. Furthermore, the measurement process takes time and energy. Moreover, the results of every measurement operation are not reusable because same are only associated with the workpiece concerned. Neither does such a process protect against a risk of collision between the workpiece and the robot. Indeed, since the trajectory of the measurement operation is identical to the trajectory of the painting operation, the robot can collide with the workpiece if the workpiece is incorrectly positioned.

Thus, there is a need to propose an adaptation of the treatment trajectories which are suitable for actual workpieces, which makes it possible to prevent any risk of collision between the workpiece and the robot and which is energy-efficient.

SUMMARY OF THE DESCRIPTION

It was found that there is a need to adapt treatment trajectories suitable for actual workpieces, which makes it possible to prevent any risk of collision between the workpiece and the robot, and which is energy-efficient.

According to a first aspect of the invention, such need is met by proposing a process of painting a workpiece using a painting robot including a robotic arm equipped with a paint spraying device, the process including a primary operation S1 of modeling a realistic 3D model including information on the paint trajectory, and a primary operation S2 of paint spraying during which the paint spraying device is moved along the paint trajectory opposite the workpiece, the primary operation S1 including secondary operations of:

S10: determining the reference coordinates of at least three model characteristic points on a nominal 3D model of the workpiece to be painted, the coordinates of the model characteristic points being expressed in a reference frame;

S20: detecting at least three actual characteristic points on the workpiece, the actual characteristic points corresponding on the workpiece to one of the model characteristic points, respectively, as determined on the nominal 3D model during operation S10;

S30: transposing the coordinates of the actual characteristic points and of the coordinates of the model characteristic points into a common frame, e.g. the reference frame; and S40: generating a realistic 3D model corresponding to the workpiece as deformed and positioned in a paint cell, by applying stress simulations to the nominal 3D model, leading to deformations which move the model characteristic points toward the respective coordinates of the corresponding actual characteristic point thereof, so as to match the position of the model characteristic points with respect to the nominal 3D model with the position of the actual characteristic points with respect to the realistic 3D model.

Optionally yet advantageously, the invention has the following features, taken individually or in combination:

Operation S20 of detecting actual characteristic points on the workpiece includes:

a sub-operation S21 of acquiring an image of the workpiece, and an image analysis sub-operation S22 for detecting the actual characteristic points of the workpiece, the actual measured characteristic points (Pr) being the same distinctive visual elements of the workpiece as the distinctive visual elements of the nominal 3D model which are considered to be the model characteristic points, and a sub-operation S23 of measuring coordinates of the actual characteristic points;

Image analysis sub-operation S22 is advantageously implemented by means of an algorithm trained by an artificial intelligence;

During sub-operation S23, actual characteristic points are associated with coordinates in the measurement system frame, and wherein the secondary operation S30 of identification includes:

a transposition sub-operation S31 during which the coordinates of the actual characteristic points expressed in the measurement system frame and the coordinates of the model characteristic points of the nominal 3D model expressed in the reference frame are expressed in the same common frame, and a sub-operation S32 of calculating a workpiece frame configured for assigning coordinates to an actual characteristic point in the workpiece frame, which are substantially equivalent to the coordinates in the reference frame of the associated model characteristic point, calculation sub-operation S32 making it possible to identify the transformation matrix from the reference frame to the workpiece frame.

Secondary operation of generating a realistic 3D model includes:

a deviation estimation sub-operation S41, during which: coordinates of the actual characteristic points expressed in the workpiece frame are compared with coordinates of the model characteristic points expressed in the reference frame, so as to associate a plurality of displacement vectors (Vd) between every model characteristic point and the corresponding actual characteristic point, thereby obtaining a displacement field, and a stress simulation sub-operation S42, carried out following the deviation estimation sub-operation S41, by applying deformations to the 3D model of the workpiece so as to minimize the positional deviations between the characteristic points of the 3D model and the positional deviations of the workpiece, so as to generate the realistic 3D model corresponding to the workpiece as deformed;

Primary operation S1 of modeling further includes a secondary operation S50 of assigning an assigned trajectory for the print head, the assigned trajectory being selected so as to correspond to the realistic 3D model in order to adapt the trajectories of the print head to the deformations of the workpiece.

Secondary sub-operation S50 of assigning includes a trajectory generation sub-operation S51 configured for generating a generated trajectory suitable for the realistic 3D model.

Secondary operation S50 of assigning further includes a saving sub-operating S52 during which every trajectory generated during trajectory generation sub-operation S51 is saved in a database associated with the realistic 3D model, and a comparison sub-operation S53 performed after model generation operation S40, configured for comparing the realistic 3D model obtained by performing model generation operation S40 with the realistic 3D models saved in the database, so that if the realistic 3D model obtained following the execution of model generation operation S40 substantially corresponds to an entry in the database, the generated trajectories associated with the entry are applied to the realistic 3D model during the execution of operation S2 of painting the workpiece.

Comparison sub-operation S53 is performed before trajectory generation sub-operation S51.

Secondary operation S50 of assigning further includes a certification sub-operation S54 performed prior to execution of the saving sub-operation S52, during which the generated trajectory calculated during trajectory generation sub-operation S51 is checked in order to verify that the generated trajectory does not include any collision between the painting robot and the workpiece.

Primary operation S1 of modeling further includes a quality control operation S60 configured for detecting a defect on a workpiece or on a production line, during which the displacement field measured during sub-operation S41 is compared with error detection thresholds, so as to detect a defect on the workpiece, and/or the components of the transformation matrix obtained during sub-operation S32 are compared with error detection thresholds, so as to detect a defect in the positioning of the workpiece and hence a defect on the production line.

According to another aspect, the invention relates to a calculation unit including a memory and a processor, the memory including a program configured for implementing a painting process according to the invention when the process is executed by the processor.

According to another aspect, the invention relates to a computer program product including code data configured, when executed by a processor or a computing unit, for implementing a process according to the invention.

According to another aspect, the invention relates to a painting robot including a robotic arm equipped with a paint spraying device including a print head, an acquisition system including an optical apparatus and a measuring system, the painting robot being configured for being controlled by means of a control station including a calculation unit according to the invention, so as to implement a process according to the invention.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION

Figure 1:
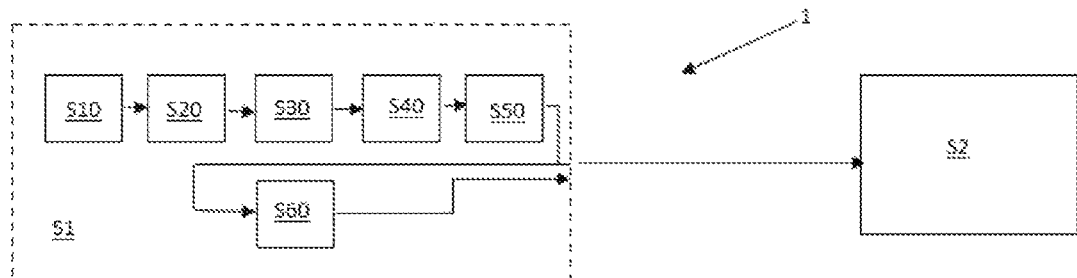
FIG. 1 is a schematic representation of a painting process according to an embodiment of the present invention.
Figure 2:
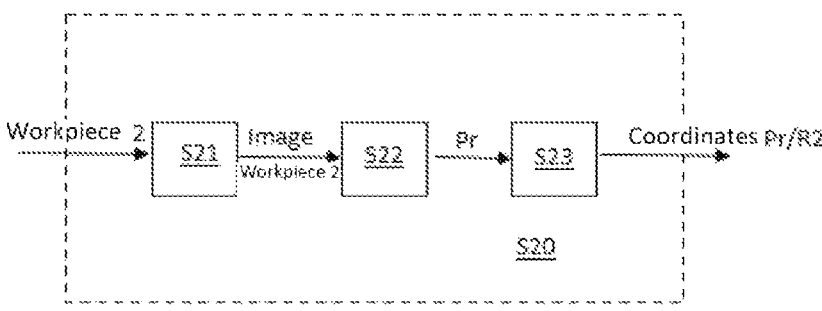
FIG. 2 is a schematic representation detailing operation S20 of a painting process according to an embodiment of the present invention.
Figure 3:
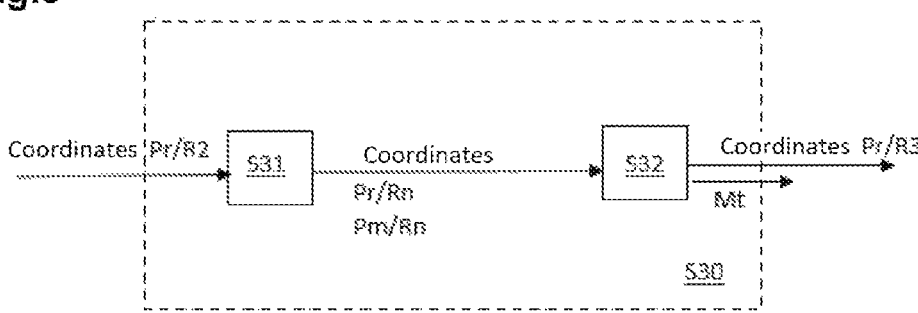
FIG. 3 is a schematic representation detailing operation S30 of a painting process according to an embodiment of the present invention.
Figure 4:
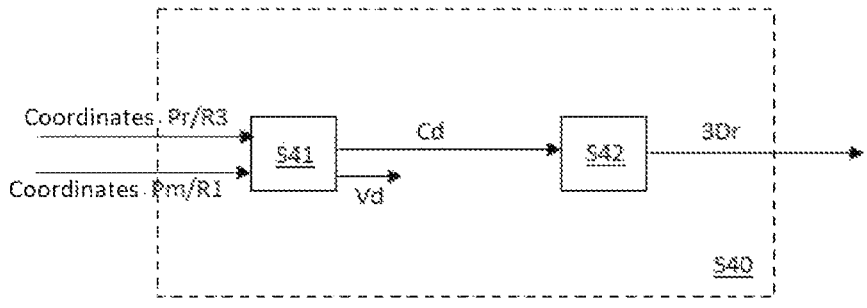
FIG. 4 is a schematic representation detailing operation S40 of a painting process according to an embodiment of the present invention.
Figure 5:
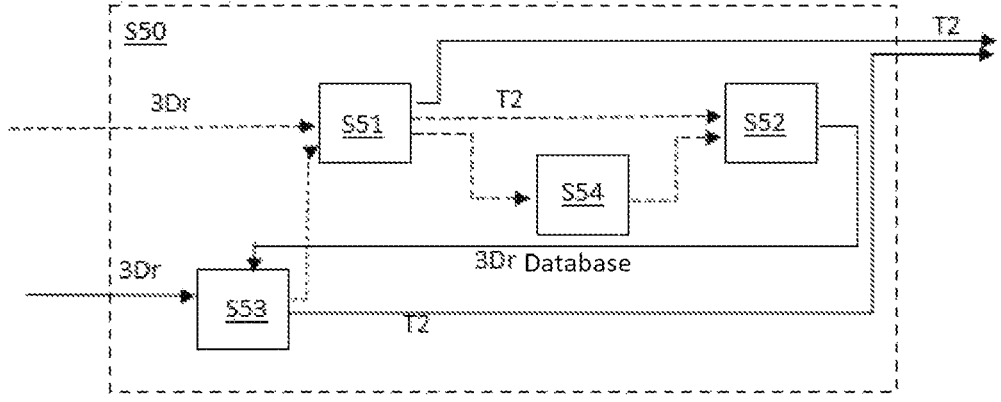
FIG. 5 is a schematic representation detailing operation S50 of a painting process according to an embodiment of the present invention.
Figure 6:
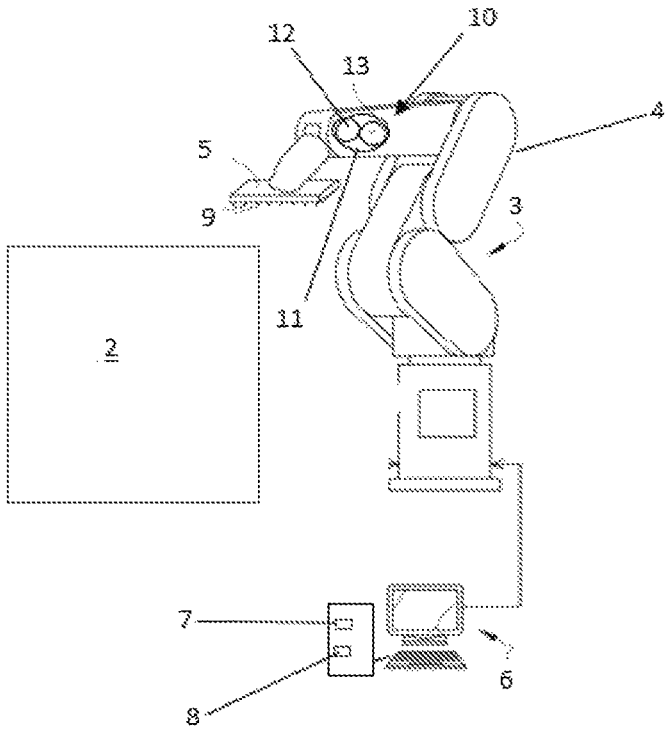
FIG. 6 shows a painting robot according to one aspect of an embodiment of the present invention.
Figure 7:
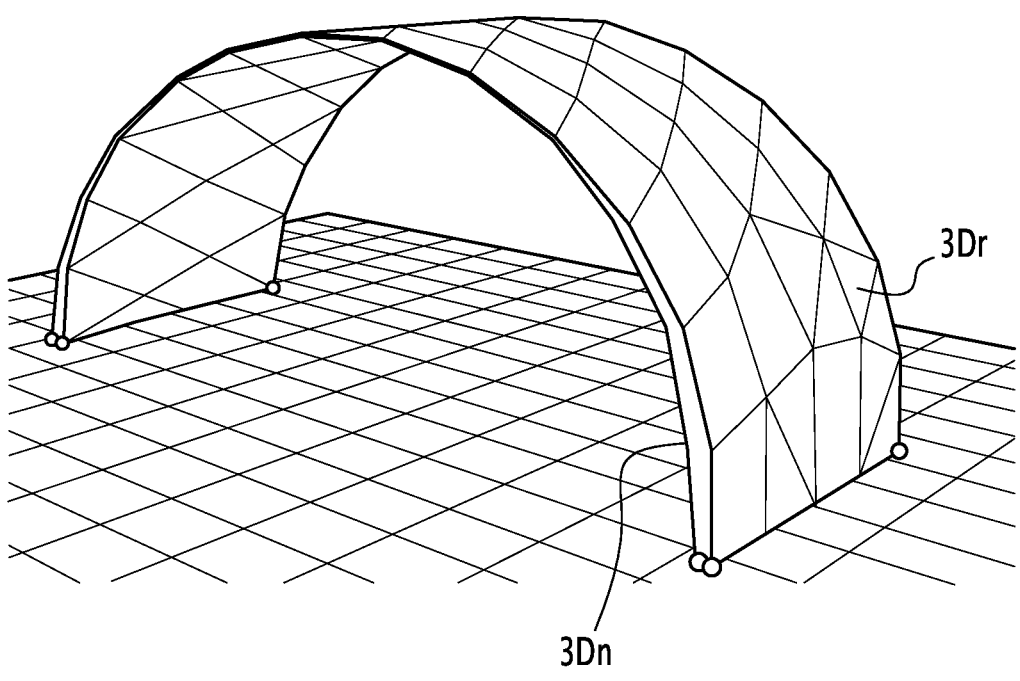
FIG. 7 is a schematic representation illustrating a nominal 3D model and a realistic 3D model obtained by a process according to an embodiment of the present invention.

Embodiments of the present invention relate to a process 1 for painting a workpiece 2 using a painting robot 3 including a robot arm 4 equipped with a paint spraying device 5, process 1 including, prior to a primary operation S2 of paint spraying by moving paint spraying device 5 along a painting trajectory opposite a workpiece to be painted, a primary operation S1 of modeling a realistic 3D model 3Dr corresponding to workpiece 2 on a production line, during an industrial process, according to a nominal 3D model 3Dn of workpiece 2 and measurements made on workpiece 2 on the production line, preferably when the workpiece is positioned in a paint cell before carrying out painting operation S2.

Paint spraying device 5 preferentially includes a print head, but may alternatively include a sprayer.

Nominal model 3Dn refers to a model of workpiece 2 as defined during the product design, with nominal dimensions of the product. Model 3Dn may be a CAD model, i.e. a computer file modeling the workpiece.

Model 3Dn of workpiece 2 is modeled and positioned in a reference frame R1 linked to model 3Dn, so that points of the model 3Dn of workpiece 2 all have reference coordinates in reference frame R1.

A realistic 3D model 3Dr is configured for representing workpiece 2 in the workshop, and thus includes geometric defects and positioning faults of workpiece 2.

Primary operation S1 of modeling model 3Dr includes secondary operations of:

S10: Determining reference coordinates Cr of at least three model characteristic points Pm on model 3Dn of workpiece 2 to be painted, reference coordinates Cr of model characteristic points Pm being expressed in the R1 reference frame;

S20: Detecting at least three actual characteristic points Pr on workpiece 2, actual characteristic points Pr corresponding to characteristic points determined respectively during operation S1;

S30: Identifying position and orientation of workpiece 2 with respect to the painting robot 3;

S40: Generating realistic model 3Dr, i.e., a model of the workpiece 2 corresponding to the workpiece 2 as deformed and positioned on the production line, by applying stress simulations to nominal model 3Dn leading to deformation, inter alia stretching, twisting, bending, so as to move model characteristic points Pm toward the respective coordinates of the corresponding actual characteristic point Pr thereof; in other words, so as to match positions of model characteristic points Pm with respect to nominal model 3Dn with positions of actual characteristic points Pr with respect to realistic model 3Dr.

The adjective "primary" which is used to qualify the operations S1 and S2, means that these operations have a higher level than the secondary operations that they include, if appropriate, such as operations S10 to S40. This relationship also applies with respect to other secondary operations mentioned hereinafter in the present description. Operations S1 and S2 may be further considered as main operations, whereas operations S10 to S40 and other operations of the same level mentioned hereinafter are unit operations of main operations S1.

Such a process is implemented by automated means of calculation, using a computer program including code data which, when executed by a processor, enable primary operations S1 of modeling to be implemented.

The invention further relates to a calculation unit 6 including a memory 7 and a processor 8, memory 7 including the program configured for implementing primary operation S1 of modeling, processor 8 being configured for implementing the program so as to perform primary operation S1 of modeling.

Painting robot 3 may be equipped with calculation unit 6, or alternatively calculation unit 6 can be off-set, e.g., integrated into a control station of painting robot 3, or integrated into a remote computer.

Realistic model 3Dr obtained by means of primary operation S1 of modeling may then be used for carrying out different processes.

In painting process 1, in particular, a process for printing a pattern on workpiece 2, carried out using painting robot 3 equipped with a paint print head 9 including a plurality of paint spray nozzles which may be controlled independently of one another, the realistic model 3Dr may be used for calculating a new trajectory of print head 9, and new nozzle activation controls which define an application trajectory.

During secondary operation S10 of determination, model characteristic points Pm refer to points of nominal model 3Dn which are used for representing position and geometry, or deformation, of workpiece 2. Points Pm are chosen so as to be easily detectable by optical sensors and image analysis processes, and are advantageously positioned on relevant zones of workpiece 2, depending on how the realistic model 3Dr of the workpiece 2 is used.

Choice of characteristic points Pm, in particular the number thereof and position thereof on workpiece 2 depends on the objective sought: readjustment of the frame, or calculation of the deformation. Characteristic points Pm may be inter alia workpiece ends, workpiece corners, segment midpoints, style lines, edges, holes, vertices, or any point which is easily detectable by image recognition. In this way, it is possible to improve the accuracy of operations S20 of detecting actual characteristic points Pr on workpiece 2.

However, it is necessary to measure at least three non-aligned characteristic points in order to be able to deduce orientation of the workpiece 2. A higher number of points overburdens the calculation, but improves the accuracy of primary operation S1 of modeling.

In a use for detecting a defect in workpiece 2, in a quality control process, it is, e.g., more relevant for certain characteristic points to be located on the most fragile or least rigid zones of workpiece 2, which are more apt to concentrate defects than solid workpieces. In this way, reliability of defect detection is improved.

In a use for adapting the trajectory of a painting robot, it is more relevant to choose certain characteristic points on the zone to be painted, which leads to a more accurate evaluation of position and geometry defects of the zone.

Secondary operation S20 of detecting actual characteristic points Pr on workpiece 2 includes a sub-operation S21 of acquiring an image of workpiece 2, carried out by an image acquisition device 10, including an optical apparatus 11, inter alia a 3D scanner or a camera, whether associated or not with a device 12 for spraying a light pattern by LED or LASER.

Preferentially, image acquisition device 10 includes a binocular optical apparatus 11 and a device 12 for spraying a light pattern, which makes it possible to facilitate detection of particular points, e.g. reliefs.

A second sub-operation S22 of image analysis is then carried out for detecting actual characteristic points Pr of workpiece 2. Sub-operation S22 of image analysis is advantageously implemented by means of an algorithm trained by artificial intelligence. Thus, at every new secondary operation S20 of detection performed, the images of the detected actual characteristic points Pr are stored in a database which enables the image analysis algorithm to be trained. In this way, it is possible to improve the robustness of secondary operation S20 of detecting actual characteristic points Pr, which is apt to detect actual characteristic points Pr even in cases of deformations or positioning faults which were not encountered before.

Actual characteristic points Pr measured are the same distinctive visual elements of workpiece 2 as the distinctive visual elements of nominal model 3Dn which are considered as model characteristic points Pm. Every actual characteristic point Pr thus corresponds to a model characteristic point Pm.

A sub-operation S23 of measuring coordinates of the actual characteristic points Pr is then carried out using image acquisition device 10. Image acquisition device 10 includes a measurement system 13, inter alia a 3D scanner, a laser measurement system, or an optical apparatus, associated with a measurement system frame R2. Measurement system 13 associates actual characteristic points Pr with coordinates in the measurement system frame R2.

The name "sub-operation" used for qualifying sub-operations S22 and S23 means that the sub-operations are of a lower level than secondary operation 20 to which they belong. In this sense, the sub-operation are tertiary operations with respect to primary and secondary operations. Such relationship further applies to other sub-operation mentioned hereinafter in the present description, and to the secondary operations to which they belong.

Secondary operation S30 is then performed, including a transposition sub-operation S31 during which coordinates of actual characteristic points Pr in the measurement system frame R2 and coordinates of the model characteristic points Pm of nominal model 3Dn expressed in the reference frame R1 will be expressed in a same common frame. This frame may be the reference frame R1 or the robot frame R0.

During measurement sub-operation S23, image acquisition device 10 measures the coordinates of actual characteristic points Pr of workpiece 2 and expresses the coordinates in measurement system frame R2.

Coordinates of actual characteristic points Pr are transposed from measurement system frame R2 into a robot frame R0.

Indeed, control of painting robot 3 involves knowing the position of painting robot 3 in robot frame R0.

The position of every point of painting robot 3 is thus known at any time in robot frame R0. Position and orientation of measuring system 13, mounted on painting robot 3, is thus known at all times in robot frame R0.

During measuring sub-operation S23, measuring system 13 evaluates the position of an actual characteristic point Pr with respect to measuring device 13. By knowing position and orientation of measuring system 13 in robot frame R0 and by knowing position of an actual characteristic point Pr with respect to measuring system 13, it is possible to calculate position of actual characteristic point Pr in robot frame R0.

In nominal model 3Dn of workpiece 2 to be treated, coordinates of every point of workpiece 2 are expressed in reference frame R1, which is a coordinate frame linked to nominal model 3Dn.

Coordinates of model characteristic points Pm of nominal model 3Dn of workpiece 2 to be treated are thus expressed in reference frame R1.

Reference frame R1 is implemented in robot frame R0, which allows coordinates of a point of reference frame R1 to be expressed in robot frame R0. In other words, a first matrix M10 for changing from reference frame R1 to robot frame R0, is known.

Indeed, robot frame R0 is configured for controlling painting robot 3. Painting robot 3 is programed and operation thereof is modeled and simulated in a paint cell model. To program operation of the robot model in the paint cell model, the robot model is associated with a model frame Rm. For painting robot 3 to be apt to repeat the operation of the robot model in the painting cell, it is necessary to be able to transpose any coordinate of model frame Rm into robot frame R0. A second matrix Mm0 for changing from model frame Rm to robot frame R0, is thus known.

In practice, a calibration operation is advantageously used for associating the origins of model frame Rm and of frame R0 so as to be able to use robot frame R0 as a common frame between the model of the paint cell and the actual paint cell.

The position of nominal model 3Dn, and hence of reference frame R1, in the workshop model is defined by design and is thus well known. A third matrix M1$m$ for changing from reference frame R1 to model frame Rm, is thus known.

It is thus possible to express in a common frame, coordinates of model characteristic points Pm and coordinates of actual characteristic points Pr, inter alia reference frame R1 or robot frame R0.

A sub-operation S32 for calculating a workpiece frame R3, which is included in secondary operation S30 of transposition, is then carried out, during which workpiece frame R3 is calculated from pairs of characteristic points. A pair of characteristic points associates a model characteristic point Pm and the corresponding actual characteristic point Pr. Such sub-operation may be carried out by different methods, inter alia by combining a barycenter method and a method of least squares, or a pseudo-inverse method. The workpiece frame R3 calculated in this way is configured for assigning to an actual characteristic point Pr, coordinates in workpiece frame R3, which are substantially equivalent to coordinates in reference frame R1 of associated model characteristic point Pm.

In other words, workpiece frame R3 is calculated so as to be the equivalent for workpiece 2 of reference frame R1 for nominal model 3Dn.

Workpiece frame R3 is then expressed in robot frame R0.

This operation identifies a transformation matrix Mt from reference frame R1 to workpiece frame R3 in robot frame R0. The coefficients of transformation matrix Mt thus reflect rotations and translations of workpiece frame R3, and hence of workpiece 2, with respect to reference frame R1, and hence with respect to nominal model 3Dn.

More specifically, in this way it is possible to identify position and orientation of workpiece 2 with respect to painting robot 3.

In this way it is possible to move trajectories of print head 9 according to position and orientation of workpiece 2, so that the path traveled by print head 9 with respect to workpiece 2, is identical to the trajectory defined for realistic model 3Dr.

In an embodiment applied to the painting of a workpiece of a car body, coordinates of the points of the different workpieces of the nominal model 3Dn are expressed in a coordinate frame linked to the nominal model 3Dn of the vehicle, which then serves as a reference frame. The matrix for changing from reference frame R1 to robot frame R0 is known, and may be used for expressing coordinates of the points of nominal model 3Dn of the vehicle in robot frame R0.

Coordinates of model characteristic points Pm of the vehicle, expressed in reference frame R1, are thus expressed in robot frame R0.

A measurement operation is used for identifying coordinates of actual characteristic points Pr in robot frame R0. Every actual characteristic point Pr is then associated with a corresponding model characteristic point Pm in order to form pairs of characteristic points. An operation of calculating an actual frame is then carried out, which then makes it possible to transpose to workpiece 2, trajectories of print head 9 defined in nominal model 3Dn.

During secondary operation S40 of generating a realistic model, a sub-operation S41 of estimating deviations is performed, during which:

coordinates of actual characteristic points Pr expressed in workpiece frame R3 are compared with
coordinates of model characteristic points Pm expressed in reference frame R1.

By comparing an absolute position deviation, in the same frame, between an actual characteristic point Pr and a model characteristic point Pm, the position deviation obtained may have a plurality of origins: a deformation of workpiece 2 with respect to nominal model 3Dn, or a positioning or an orientation of workpiece 2 with respect to the robot, which is different from the positioning or the orientation of nominal model 3Dn with respect to the robot.

By first performing sub-operation S32 of calculating an actual reference linked to workpiece 2, herein workpiece frame R3, and by expressing coordinates of actual characteristic points Pr in workpiece frame R3, it is possible to remove the orientation and the displacement components of workpiece 2 from coordinates of actual characteristic points Pr measured on workpiece 2.

The position deviations which remain between a model characteristic point Pm and corresponding actual characteristic point Pr, are thus considered as deformations of workpiece 2.

Such sub-operation S41 of estimating deviations may be used for associating a plurality of displacement vectors Vd between every model characteristic point Pm and corresponding actual characteristic point Pr, which makes it possible to obtain a displacement field Cd.

A stress simulation sub-operation 42 is then carried out by applying deformations to the 3D model of the workpiece so as to minimize the positional deviations between characteristic points of the 3D model and those of workpiece 2. In other words, deformations of the 3D model are simulated by applying forces thereon to reproduce the measured displacement field Cd. It is in this way possible to generate a realistic model 3Dr, with a geometry substantially identical to workpiece 2.

Nominal model 3Dn is thus modified so as to generate a realistic model 3Dr corresponding to workpiece 2 to be painted.

A secondary operation S50 of assigning new trajectories for print head 9 is then carried out, in order to adapt trajectories of print head 9 to deformations of workpiece 2.

Nominal model 3Dn includes information on print head 9 trajectory, or on a print trajectory TO, along with activation information associated with every point or segment of print trajectory TO, the activation information representing activation of every nozzle of print head 9 for every point or segment of print trajectory T.

During secondary operation S50, a new trajectory, or assigned trajectory T1, and the associated nozzle activation information is selected so as to match realistic model 3Dr. A plurality of methods may be used for selecting such trajectories.

A trajectory generation sub-operation S51, which is included in secondary operation S50, may be performed in order to generate a generated trajectory T2 suitable for realistic model 3Dr.

Such a generation sub-operation T51 is described in detail in patent application FR-A-3111586, the contents of which are incorporated herein by reference, and will not be described in detail herein.

The application FR-A-3111586 describes implementation of the following successive operations, carried out by a computer:

(a) defining, by automatic calculation from the computer file modeling the surface to be coated, a segment of the surface to be coated;
(b) defining, by automatic calculation and by iterations, a trajectory opposite the segment of surface to be coated, the trajectory being formed by a series of remarkable points to be reached by a determined point of the print head with, at every remarkable point, a print head orientation to be observed;
(c) removing, by calculation, the segment to be coated from the computer file modeling the surface to be coated;
(d) repeating operation (a) until the modeled surface to be coated has a zero surface area;
(e) defining a program for activating the print head nozzles on every trajectory; and
(f) during execution of trajectory generation sub-operation S51, execution of operations (a) to (e), starting from simple elements identified on the periphery of a surface to be coated, such as points, segments or edges, defining, from a 3D model of the surface to be coated, makes it possible to generate a three-dimensional trajectory of the robot only according to the surface to be coated, by making round trips with a print head. In this way the activation program for the print head nozzles may be generated automatically, in order to apply the coating product to the surface to be coated, where the product should be applied and with the correct orientation of the print head.

Application FR-A-3111586 further describes that operation (b) includes successive sub-operation s:

(bA) defining by iteration a portion of the segment of surface to be coated;

(bB) calculating a point of impact on the segment defined in the sub-operation (bA) and an orientation axis of the print head at the point of impact;

(bC) removing, by calculation, a fraction of the segment of surface to be coated;

(bD) repeating operation (bA) until the segment of surface to be coated has a zero surface area;

(bE) generating a part of the trajectory corresponding to an outward travel of the print head along the segment to be coated; and (bF) depending on the width of a stream of coating product coming from the print head and a width of the segment to be coated, generating, where appropriate, a part of the trajectory corresponding to a return or an additional outward travel of the print head along the segment to be coated.

When the surface to be coated includes at least one zone not to be coated, the process includes an additional operation, carried out between operations (b) and (c):

(g) adapting the trajectory of the print head to the zone not to be coated, so as not to hit the object.

Operation (a) includes at least successive sub-operations:

(a1) defining a first orthogonal frame having
the origin thereof in a point selected by a user on an imaginary support surface located near the surface to be coated in a representation of the space using the computer file, or on the surface to be coated as such, the height axis normal to the support surface or to the surface at the point of origin,
the ordinate axis is the vector product between the height axis and an axis aligned along a forward direction selected by the user, and
the abscissa axis is the vector product between the ordinate axis and the height axis;

(a2) defining a first normal and initiating the value thereof as being equal to a vector, the direction of which is the height axis of the first orthogonal frame which was last defined;

(a3) defining, in the first orthogonal frame, a first point as a point on the surface to be coated, the ordinate of which is the highest in the first orthogonal frame, among the points on the surface to be coated;

(a4) defining, in the first orthogonal frame, a second point as a point on the surface to be coated located, with respect to the first point, at a first distance measured along the ordinate axis and in a negative direction along the axis, the first distance being set according to the distribution of the nozzles on the print head;

(a5) calculating a mean normal to a temporary segment of the surface to be coated defined between a first plane and a second plane perpendicular to the ordinate axis of the first orthogonal frame and passing through the first and second points, respectively;

(a6) comparing the first normal and the mean normal;

(a7) if the first normal and the mean normal are identified as being different in operation (a6),
(a71) redefining the first normal as being equal to the mean normal;
(a72) redefining the first orthogonal frame taking the new first normal into account; and
(a73) repeating sub-operations (a3) to (a6); and (a8) if the first normal and the mean normal are identified as being equal in operation (a6), defining the segment to be coated as being equal to the temporary segment of operation (a5).

Operation (b) includes at least successive sub-operation:

(b1) defining a second orthogonal frame with the origin at the first point, and with the abscissa, ordinate and height axes thereof coinciding with the axes of the first orthogonal frame which was last defined, in operation (a1) or in operation (a72);

(b2) defining a new abscissa axis as the abscissa axis of the second orthogonal frame;

(b3) defining, in the second orthogonal frame, an initial point as a point on the segment of surface to be coated, the abscissa of which is the lowest of the points on the segment;

(b4) defining, in the second orthogonal frame, a cut-off point as a point on the segment of surface to be coated, which is located, with respect to the initial point and along the new abscissa axis, at a given distance;

(b5) calculating a mean normal to a temporary portion of the segment of the surface to be coated defined between a third plane and a fourth plane perpendicular to the new abscissa axis and passing through the initial point and through the cut-off point, respectively;

(b6) calculating a temporary longitudinal axis equal to the normalized vector product between the mean normal calculated in operation (b5) and the opposite of the ordinate axis of the second orthogonal frame;

(b7) comparing the new abscissa axis and the temporary longitudinal axis;

(b8) if the new abscissa axis and the temporary longitudinal axis are identified as being different in operation (b7),
(b81) redefining the new abscissa axis as being equal to the temporary longitudinal axis;
(b82) repeating sub-operation (b3) to (b7); and (b9) if the new abscissa axis and the temporary longitudinal axis are identified as being equal in operation (b7), defining a portion of the segment to be coated as being equal to the temporary segment of operation (b5).

Operation (b) includes at least successive sub-operations following sub-operations (b1) to (b9):

(b10) calculating an orientation vector of the print head, equal to the vector product between the new abscissa axis and the opposite of the ordinate axis of the second orthogonal frame;

(b11) defining a center point as a point located
midway between the orthogonal projections of the initial point and of the cut-off point on a line passing through the initial point and with direction vector equal to the new axis, and
at a third distance from the initial point measured along the ordinate axis of the second orthogonal frame and in a negative direction along the axis, the third distance being equal to half the first distance;

(b12) defining a point of impact as the projection of the center point on the portion of the segment of surface to be coated along a line the director vector of which is the orientation vector of the print head; and (b13) if the point of impact exists, adding the point of impact and the print head orientation vector to the trajectory.

The nozzles of the print head are arranged in parallel rows, whereas the abscissa along the new abscissa axis of the second orthogonal frame, of the center point, is equal to the half-sum of the abscissas of the orthogonal projections of the initial point and of the cut-off point on a line passing through the initial point with the director vector equal to the new axis and whereas the center point is shifted with respect to the line and in the opposite direction to the direction of the ordinate axis of the second orthogonal frame, by a distance measured along the ordinate axis and equal to half the product between the number of rows of nozzles and the distance between two of the rows.

If the point of impact of operation (b12) does not exist, due to the absence of material in the segment of surface to be coated along a line, the director vector of which is the orientation vector of the print head, and which passes through the center point, additional sub-operations are implemented between the sub-operations (b12) and (b13):

(b14) searching for an extreme point on the portion of segment to be coated the position of which along an axis parallel to orientation vector of the print head, is the farthest in a direction opposite to the vector;

(b15) projecting the extreme point onto an axis passing through the center point and parallel to the orientation vector of the print head, so as to define an alternative point of impact; and (b16) assimilating the point of impact to the alternative point of impact for the portion of segment to be coated during treatment.

Operation (b) includes at least successive sub-operations following sub-operation (b1) to (b13):

(b18) reducing the segment of surface to be coated by a fraction of the segment, in particular of the segment defined in operation (b9);

(b19) determining whether the segment of surface to be coated has a non-zero surface area; and (b20) if the result of the determination in operation (b19) is positive, repeat sub-operation (b3) to (b19).

Operation (b) includes at least successive sub-operations following sub-operation (b1) to (b13):

(b21) defining an axis vector of the print head at every point of impact as being equal to the normalized vector product between the orientation vector of the print head at the point and the ordinate axis of the second orthogonal frame;

(b22) defining a remarkable point to be reached from the point of impact, the distribution of the nozzle(s) on the print head, the axis vector of the head and the ordinate axis of the second orthogonal frame; and (b23) including the remarkable point and the orientation vector of the print head at the corresponding point of impact in the trajectory.

Operation (b) includes an additional sub-operation of adding at least one entry point and/or at least one exit point to the trajectory defined for every segment of the surface to be coated, in addition to the points calculated in operation (b23), and/or operation (b) includes an additional sub-operation of optimizing the number of remarkable points of the trajectory during which at least one remarkable point is removed, namely a remarkable point collinear with a point preceding same and with a point following same along the trajectory, the orientation axis of which being parallel to the orientation axis of the point preceding same and with the orientation axis of the point following same along the trajectory.

Operation (b) includes a sub-operation of determining, depending on the width of a stream of coating product coming from the print head and on a width of the segment of surface to be coated, the number of orbits of the print head to be carried out for coating the segment to be coated and, where appropriate, a segment or segments of the trajectory, following the first forward travel, being calculated by reversing the order of the remarkable points defined in operation (b22) for the preceding segment of trajectory.

Sub-operations (a71) to (a73) or sub-operations (b81) and (b82) are performed until a limit number of iterations is reached.

From the trajectory defined in operation (b), the computer calculates, for every nozzle of the print head, a distance to be coated or a distance not to be coated over a series of forward motion operations of the print head.

Operation (e) includes sub-operations:

(e1) discretizing the movement of the print head between remarkable points of a trajectory, by means of discretized positions;

(e2) determining the existence of a point of impact from every nozzle at every position which was discretized in sub-operation (e1);

(e3) calculating a distance to be coated or a distance not to be coated at every discretized position of the trajectory and, if appropriate, multiplier coefficients, depending on the distance between a nozzle and a reference nozzle; and (e4) building a programming file for the activation of nozzles along trajectories.

Such elements are described in detail in FR-A-3111586 the contents thereof are incorporated by reference in the present application.

Advantageously, every trajectory T2 generated during trajectory generation sub-operation S51 is then saved in a database associated with the corresponding realistic model 3Dr during a saving sub-operation S52.

Advantageously, secondary operation S50 of assigning further includes a sub-operation S53 of comparison with the models saved in the database listing the realistic models 3Dr and the associated generated printing trajectory T2 thereof, comparison sub-operation S53 being carried out after secondary operation S40 of model generation, and advantageously before sub-operation S51 of trajectory generation.

During comparison sub-operation S53, realistic model 3Dr obtained by performing sub-operation S40 of model generation is compared with realistic models 3Dr saved in the database.

If realistic model 3Dr obtained following execution of operation S40 of model generation corresponds substantially to an entry in the database, the generated trajectories T2 associated with the entry are applied to realistic model 3Dr during the operation of painting workpiece 2. In this way, calculation necessary to implement the process is limited, preventing execution of sub-operation S51 of trajectory generation if it is not needed, saving time and energy.

Coordinates of characteristic points of realistic model 3Dr obtained following execution of model generation operation S40, are compared with coordinates of characteristic points of the model of the database, so as to obtain a Ce error field. It is understood that coordinates of such points are expressed in the workpiece frame R3 linked correspondingly to realistic model 3Dr on the one hand, and to the model of the database on the other hand, so as to compare only the geometric deviations linked to deformations.

The correspondence between realistic model 3Dr and the model from the database is observed if every error is less than a first threshold established by the user depending on the application constraints, and if the sum of the squares of all errors is less than a second threshold as defined by the user. The first threshold and the second threshold are determined by the user depending on the quality and performance constraints that the user desires to achieve. The first threshold may, e.g., have an order of magnitude of one tenth of a millimeter, and the second threshold may. e.g., be on the order of magnitude of one millimeter.

If realistic model 3Dr obtained following execution of operation S4 does not correspond to an entry in the database, a trajectory generation sub-operation S51 is executed so as to calculate a new printing trajectory corresponding to realistic model 3Dr.

Trajectory generation sub-operation S51 may be performed either "on-line", i.e., the production line is stopped during execution of trajectory generation sub-operation S51, or "off-line", i.e., workpiece 2 is taken out of the production line, which enables a new process for the next workpiece to be started and the flow of the production line to be maximized. After workpiece 2 is taken out of the production line, a trajectory generation sub-operation S51 is performed, and the trajectories calculated for the surface in the database are saved during a database saving sub-operation S52, with the associated realistic model 3Dr, creating a new entry in the database.

Optionally, a certification sub-operation S54 is performed before the saving sub-operation S52 is executed, during which generated trajectory T2 calculated during trajectory generation sub-operation S51 is checked in order to verify that generated trajectory T2 does not include a collision between painting robot 3 and workpiece 2. Certification sub-operation S54 may be provided by an operator by observing implementation of the painting operation using generated trajectory T2, or by numerical simulation of the painting phase.

In this way, only certified conforming trajectories are saved in the database, which limits the risk of deterioration of the workpiece during production.

It is also advantageous, during trajectory generation sub-operation S51, to impose waypoints on the robot in order to prevent any collision with workpiece 2, or to generate a tolerance space wherein every point of the trajectory has to be located. The tolerance space may, e.g., be obtained by positioning two surfaces corresponding to nominal model 3Dn of workpiece 2 located at a given distance from each other, or by applying an orientation and position constraint to every trajectory point, e.g., every point of a generated trajectory has to have an orientation within a 45° opening cone, preferentially a 20° opening cone with respect to a normal to workpiece 2 at the point of the generated trajectory.

It is in this way possible to impose constraints during the generation of a new trajectory, which prevent risk of collision between the robot and the workpiece.

Advantageously, a secondary operation S60 of quality control may be carried out using different elements calculated during the model generation process.

Different detection thresholds may, e.g., be applied to two elements: frame transformation matrix Mt determined during sub-operation S32 of calculating a workpiece frame and a displacement field Cd determined during sub-operation S41 of estimating deviations.

In a manner comparable to comparison sub-operation S53, measured displacement field Cd is compared with error detection thresholds, configured in such a way that if one of the vectors of the field exceeds an error detection threshold, workpiece 2 is considered to be non-conforming, and the sum of the displacements is further compared with a second detection threshold so as to declare workpiece 2 to be non-conforming if the sum of the displacements exceeds the threshold.

Components of transformation matrix Mt are compared with error detection thresholds: every translation component has to be less than a first threshold, the sum of the translation components has to be less than a second threshold, the rotation components have all to be less than a third threshold, and the sum of the rotation components has be less than a fourth threshold.

It is necessary to first compare the rotation components of the frame transformation matrix; if the fault detection threshold of the sum of the rotation components is not reached, the comparison of the fault detection thresholds on the rotation components is carried out; if one of the thresholds is reached, workpiece 2 is declared to be incorrectly positioned; in this way, a non-conforming operation of the production line is identified.

The theoretical position of workpiece 2 with respect to the origin of the robot frame is known, hence the theoretical translation associated with a rotation according to rotation components of the frame transformation matrix may be calculated.

The translation components are then compared with the theoretical translation associated with the rotation. In this way, positioning errors can be obtained. The positioning errors are compared to error detection thresholds. If a threshold is reached, workpiece 2 is declared to be incorrectly positioned. In this way it is possible to detect a fault in operation of the production line.

Primary operation S1 of modeling workpiece 2 may thus be used, in addition to modeling the zone to be painted on workpiece 2 and the trajectory to be performed, to perform a quality control of workpiece 2, by comparing deformation at certain critical points with tolerance thresholds. In this way it is possible to detect if the quality of a production line deteriorates and to intervene with it.

In this way, it is further possible to detect characteristic deformation of a production line and to directly apply a paint trajectory saved beforehand and corresponding to the characteristic deformation, saving computing power by limiting the calculation of paint trajectories.

The invention claimed is:

1. A process for painting a workpiece by using a painting robot comprising a robotic arm equipped with a paint spraying device, the process comprising:

modeling a realistic 3D model comprising information on a paint trajectory, comprising:

determining reference coordinates of positions of at least three model characteristic points on a nominal 3D model of the workpiece to be painted, with reference to a model reference frame;

detecting coordinates of positions of at least three actual characteristic points on the workpiece, each actual characteristic point on the workpiece corresponding to a respective one of the model characteristic points, as determined on the nominal 3D model during said determining;

transforming coordinates of actual characteristic points and coordinates of the model characteristic points into a common frame of reference; and generating a realistic 3D model corresponding to the workpiece as deformed and positioned in a paint cell, by applying mechanical stress simulations to the nominal 3D model leading to computed deformations which move the model characteristic points toward their corresponding actual characteristic points, so as to match the positions of the model characteristic points with respect to the nominal 3D model with the positions of the actual characteristic points with respect to the realistic 3D model; and spraying paint, comprising moving the spraying device opposite the workpiece along the paint trajectory.

2. The process according to claim 1 wherein the common frame of reference is the model reference frame.

3. The process according to claim 1, wherein said detecting comprises:

acquiring an image of the workpiece;

detecting the actual characteristic points of the workpiece, corresponding to the model characteristic points via the nominal 3D model; and measuring coordinates of the actual characteristic points.

4. The process according to claim 3, wherein said detecting the actual characteristic points is implemented by means of an algorithm trained by artificial intelligence.

5. The process according to claim 3, wherein during said measuring, the actual characteristic points are associated with coordinates relative to a measurement system frame, and wherein said transforming comprises:

expressing the coordinates of the actual characteristic points relative to the measurement frame, and the coordinates of the model characteristic points of the nominal 3D model relative to the model reference frame, in the common frame; and calculating a workpiece frame for assigning coordinates to an actual characteristic point, which are approximately equivalent to coordinates in the model reference frame, making it possible to identify a transformation matrix from the model reference frame to the workpiece frame.

6. The process according to claim 5, wherein said generating comprises:

comparing coordinates of the actual characteristic points expressed in the workpiece frame with coordinates of the model characteristic points expressed in the model reference frame, to associate and associating a plurality of displacement vectors between each model characteristic point and its corresponding actual characteristic point, thereby obtaining a displacement field; and applying deformations to the nominal 3D model of the workpiece so as to minimize positional deviations between the model characteristic points of the nominal 3D model and positional deviations of the workpiece, and generating the realistic 3D model corresponding to the workpiece as deformed.

7. The process according to claim 6, wherein said modeling further comprises:

detecting a defect on a workpiece or production line, wherein the displacement field obtained by said comparing is compared with error detection thresholds to detect a defect on the workpiece, and/or components of the transformation matrix obtained by said calculating are compared with error detection thresholds, so as to detect a positioning fault of the workpiece and therefore a defect on the production line.

8. The process according to claim 1, wherein said modeling further comprises assigning a trajectory for a print head, the assigned trajectory being selected so as to correspond to the realistic 3D model in order to adapt the trajectory of the print head to deformations of the workpiece.

9. The process according to claim 8, wherein said assigning comprises generating a trajectory for the realistic 3D model.

10. The process according to claim 9, wherein said assigning further comprises:

saving each generated trajectory and the associated realistic 3D model as entries in a database; and comparing the realistic 3D model obtained by said generating with the realistic 3D models in the database, so that when the realistic 3D model obtained following execution of said generating corresponds approximately to an entry in the database, generated trajectories associated with the entry are applied to the realistic 3D model during said paint spraying.

11. The process according to claim 10 wherein said comparing is performed prior to said generating a trajectory.

12. The process according to claim 10, wherein said assigning further comprises prior to said saving, checking the generated trajectory to verify that the generated trajectory does not include any collision between the painting robot and the workpiece.

13. A computing unit comprising:

a processor; and a memory comprising a program configured for implementing the painting process according to claim 1 when executed by said processor.

14. A non-transitory computer-readable medium including instructions which, when implemented by a processor, cause the processor to perform the process according to claim 1.

15. The painting robot comprising:

a robotic arm equipped with the paint spraying device, the painting robot controlled by means of a control station comprising the computing unit according to claim 13;

a print head; and an acquisition system comprising an optical apparatus and a measuring system.

* * * * *